(12) United States Patent
Ishizaka (10) Patent No.: US 7,433,882 B2
(45) Date of Patent: Oct. 7, 2008

(54) DATA MANAGEMENT SYSTEM AND COMPUTER PROGRAM

(75) Inventor: Takashi Ishizaka, Tokyo (JP)

(73) Assignee: Beacon Information Technology, Inc., Tokyo (JP)

( * ) Notice: Subject to any disclaimer, the term of this patent is extended or adjusted under 35 U.S.C. 154(b) by 656 days.

(21) Appl. No.: 10/346,368

(22) Filed: Jan. 17, 2003

(65) Prior Publication Data

US 2003/0140194 A1    Jul. 24, 2003

(30) Foreign Application Priority Data

Jan. 21, 2002  (JP) .............................. 2002-011455

(51) Int. Cl.
*G06F 17/00* (2006.01)

(52) U.S. Cl. ........................ 707/102; 707/100; 707/101

(58) Field of Classification Search ................. 707/3, 707/4, 101, 102, 104.1; 705/26
See application file for complete search history.

(56) References Cited

U.S. PATENT DOCUMENTS

| | | | |
|---|---|---|---|
| 6,631,382 B1 * | 10/2003 | Kouchi et al. ................ | 707/102 |
| 7,185,010 B2 * | 2/2007 | Morinville ...................... | 707/6 |
| 2003/0041072 A1 * | 2/2003 | Segal et al. .............. | 707/104.1 |

\* cited by examiner

*Primary Examiner*—Sana Al-Hashemi
(74) *Attorney, Agent, or Firm*—Dobrusin & Thennisch PC (57) ABSTRACT

A data management system is provided that manages sets in an orderly fashion.

Sets are hierarchically organized according to implications thereof and stored in a set storage device 20. When a set in the relatively upper level of the hierarchy is specified among the hierarchically structured sets, a main controller section 10 performs a logical operation on all sets that belong to lower levels of the hierarchy thereof, and causes a display device DP to display a result of the logical operation as contents of said set specified.

20 Claims, 7 Drawing Sheets

FIG. 1

| OBJECT ID | 1ST CODE SYSTEM CUSTOMER CODES | 2ND CODE SYSTEM CUSTOMER CODES | 3RD CODE SYSTEM CUSTOMER CODES | CUSTOMER NAME | CUSTOMER ADDRESS |
|---|---|---|---|---|---|
| 1 | 0001 | A0001 | X003 | COMPANY A | TOKYO |
| 2 | 0002 | A0002 |  | COMPANY B | TOKYO |
| 3 | 0003 |  | Y001 | COMPANY C | KANAGAWA |
| 4 | 0004 | B0001 | X002 | COMPANY D | KANAGAWA |
| 5 | 0005 | B0002 | X001 | COMPANY E | KANAGAWA |
| 6 | 0006 | B0003 |  | COMPANY F | KANAGAWA |
| 7 | 0007 |  | Y002 | COMPANY G | KANAGAWA |
| 8 | 0008 | C0001 | Z001 | COMPANY H | CHIBA |

FIG. 2

| SET ID | SET NAME | OBJECT COUNT | OBJECT ID LIST |
|---|---|---|---|
| 3 | 1 PERSON | 1 | 1 |
| 4 | 2 PERSONS | 2 | 2, 5 |
| 5 | 3 PERSONS | 2 | 3, 4 |
| 6 | 4 PERSONS | 1 | 7 |
| 9 | 5 PERSONS | 2 | 6, 8 |

FIG. 3

| CUSTOMER CODE |
|---|
| A0002 |
| B0002 |

FIG. 4A

| OBJECT ID |
|---|
| 2 |
| 5 |

FIG. 4B

```xml
- <set id="1" parent="0" >
    <name> 1-9 employees </name>
    - <idlist>
        <setid>2</setid>
        <setid>8</setid>
    </idlist>
  </set>
```
⟵ DEFINITION OF SET FOLDER "1-9 EMPLOYEES" THERE ARE TWO LINKS TO LOWER LEVEL OF HIERARCHY.

```xml
- <set id="2" parent="1">
    <name> 1-4 employees </name>
    - <idlist>
        <setid>3</setid>
        <setid>4</setid>
        <setid>5</setid>
        <setid>6</setid>
    </idlist>
  </set>
```
⟵ DEFINITION OF SET FOLDER "1-4 EMPLOYEES" ITS UPPER LEVEL OF HIERARCHY IS "1-9 EMPLOYEES". THERE ARE FOUR LINKS TO LOWER LEVEL OF HIERARCHY.

```xml
- <set id="3" parent="2">
    <name> 1 employee </name>
    <idlist />
  </set>
```
⟵ DEFINITION OF SET "1 EMPLOYEE" ITS UPPER LEVEL OF HIERARCHY IS "1-4 EMPLOYEES". IT DENOTES A SET BECAUSE THERE IS NO LINK TO LOWER LEVEL OF HIERARCHY.

```xml
- <set id="4" parent="2" >
    <name>2 employees</name>
    <idlist />
  </set>

- <set id="5" parent="2">
    <name>3 employees</name>
    <idlist />
  </set>
```

FIG. 5

```
- <set id="6" parent="2">
    <name>4 employees</name>
    <idlist />
  </set>

- <set id="8" parent="1">
    <name> 5-9 employees  </name>
    - <idlist>
        <setid>9</setid>
        <setid>10</setid>
        <setid>11</setid>
        <setid>12</setid>
        <setid>13</setid>
      </idlist>
  </set>

- <set id="9" parent="8">
    <name>5 employees</name>
    <idlist />
  </set>
  :
  :
  :
```

DATA MANAGEMENT SYSTEM AND COMPUTER PROGRAM

CROSS-REFERENCE TO RELATED APPLICATION

The present application claims priority from Japanese Application No. 2002-11455 filed Jan. 21, 2002, the disclosures of which is hereby incorporated by reference herein.

FIELD OF THE INVENTION

The present invention relates to data management systems, and more specifically to an approach for hierarchically managing sets, or a collection of data belonging to a certain conditional scope, according to their implications.

BACKGROUND OF THE INVENTION

With a database management system (DBMS), when it comes to searching data stored in database structures within and/or outside the system, the operator typically inputs search criteria into the DBMS, which extracts data that matches the search criteria entered. The data so extracted has its specific implication, one by one. Thus, attempts have been made to retain a collection of such data as a set and include that set in a search target as well, thereby facilitating efficient search processing.

When a set is stored, a name that reflects its implication is imparted to the set, or a memo or the like that describes an implication of the set is attached thereto, in order to recognize individual sets.

However, as the number of sets increases, such identification techniques become meaningless. For example, assuming that a search is conducted on items describing the number of employees of a company, then there are a great variety of sets, including: a set of medium-sized companies (having 50 through 500 employees); a set of small-sized companies (having 50 or less employees); a set of mom-and-pop companies (having four or less employees); a set of companies having four employees; a set of companies having three employees; a set of companies having three or four employees; a set of companies having one employee; and so forth. An actual search is typically conducted using search criteria across several items; as such, if a search criterion related to the "region", for example, is merely added to the afore-described "number of employees", the number of sets would increase unlimitedly, such as a set of companies of medium size (having 50 through 500 employees) and located in Tokyo; a set of companies of medium size (having 50 through 500 employees) and located in Kanagawa; a set of companies of medium size (having 50 through 500 employees) and located in Chiba; and so on.

In this way, it could become difficult to find a set of interest among enormous amounts of sets merely through names of sets or their memos, and even though it has been retained as an already searched set, it could no longer be searched quickly.

With techniques for identifying individual sets by names of sets or memos, etc., ones having identical implications but different names might be created unless names or memos are assigned by stringent rules; as a result, useless sets would be stored in redundancy.

In addition, there may be cases where sets having similar implications have to be retained in redundancy because search criteria are slightly different. In the afore-described example, the set of mom-and-pop companies (having four or less employees), the set of companies having four employees, the set of companies having three or four employees are overlapped in the sense that those are companies having four employees; however, because queries about the number of employees to be determined are different, they are separate sets from each other.

Furthermore, there are often cases where data on the same customer are managed according different concepts, such as sales data and repair data regarding a particular customer, or where data of exactly identical contents are managed under different code systems among database structures. In such cases, it is necessary to modify the system so as to have a unified code system, or to separately build an analytical system having a unified code system and import data into that analytical system.

Additionally, even though a desired result may be obtained more quickly by collecting and retaining search results as sets than not by collecting as sets, identification information alone that identifies each set element would not be enough for outputting a final search result.

For example, unless information, such as the name, address, telephone number, etc. of a customer identified by the identification information is appended in addition to the identification information before it is outputted, the resulting information would often be insufficient. In order to output such information, reference must be made separately to a database structure that records customer names, addresses, telephone numbers, and so forth. In other words, to utilize the sets, cooperation is required with the database structure that provides a basis for creating sets, when a search is conducted. Thus, search service may be requested during a period when the database structure is not operational due to its maintenance or for other reasons, or, because of its architecture, it cannot be applied to a search system that is not physically connected to the database structure.

Accordingly, it is an object of the present invention to provide a mechanism for enabling search and other operations on sets to be performed quickly by managing sets in an orderly fashion.

SUMMARY OF THE INVENTION

To achieve the above object, the present invention provides a data management system, comprising: a storage device for hierarchically organizing and storing sets, or a collection of data that belong to a certain conditional scope, according to implications thereof; and a processing means for performing, when a set in the relatively upper level of the hierarchy is specified among the hierarchically structured sets stored in said storage device, a logical operation on all sets that belong to lower levels of the hierarchy thereof and for causing a predetermined display device to display a result of the logical operation as contents of said set specified.

Within the storage device, said set is stored in a set folder. The processing means updates the contents of said set and the sets in the upper level of the hierarchy thereof, as new data is placed as a set in said set folder.

Preferably, said processing means includes an ID conversion mechanism for converting IDs (hereinafter also referred to as identification information) of data represented by multiple types of code systems that are different from each other into a common ID, wherein: IDs of multiple data that have identical or similar implications to each other but are represented by different code systems are converted into a relevant common ID by said ID conversion mechanism, so that said multiple data are handled as a collection of data (set) on which said logical operation can be performed, respectively.

It should be appreciated that the concept of "data" described herein may include a collection of data comprised of a data list and so forth, that is, sets.

Said processing means includes a set definition mechanism for defining an implication for a set and a list import mechanism for importing a list of data that provides a basis for creating a new set, so that said set definition mechanism and list import mechanism are activated independently and concurrently.

From the standpoint of facilitating identification of set elements, a means is further included for causing said storage device to retain information that represents data (set element) identified by an individual common ID in such a form as paired with said common ID, and said processing means utilizes said information in order to identify the result of said logical operation.

The present invention further provides a computer program.

The computer program causes a computer system having a storage device and a display device to execute processing of: hierarchically organizing sets, or a collection of data that belong to a certain conditional scope, according to implications thereof, and storing them in said storage device; and performing, when a set in the relatively upper level of the hierarchy is specified among the hierarchically structured sets stored in said storage device, a logical operation on all sets that belong to lower levels of the hierarchy thereof and for causing said display device to display a result of the logical operation as contents of said set specified.

DETAILED DESCRIPTION OF THE PREFERRED EMBODIMENT

An embodiment of the present invention is described below in detail with reference to the drawings.

Figure 1:
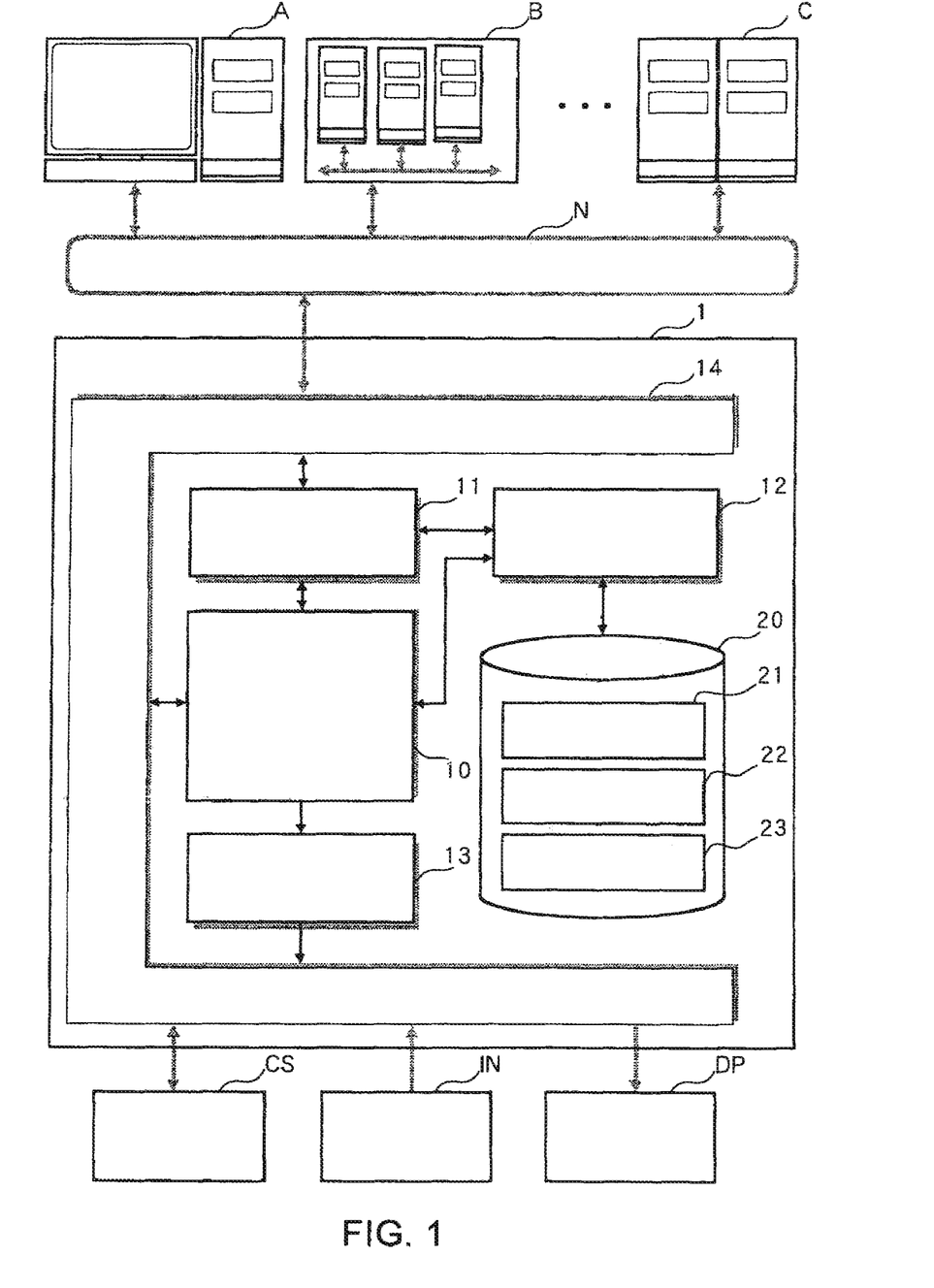
FIG. 1 is a schematic diagram of a data management system according to an embodiment of the present invention.

FIG. 1 is a schematic diagram of a data management system according to the present invention.

The data management system 1 is implemented by a computer connected to an external storage device, such as a hard disk, a display device DP, and an input device IN; and a computer program of the present invention, which is read and executed by the computer. The computer includes a function of performing bidirectional communication among a plurality of database structures A, B, and C via a network N, and a function of performing bidirectional communication with a local system CS connected to a local area network (not shown).

The database structures A, B, and C are external servers that store data that provides a basis for sets, data warehouses, or other data storage means; they have a mechanism for conducting a data search in response to a request from the data management system 1 and outputting the search result thereof to the data management system 1.

It should be appreciated that although three database structures A, B, and C are presented in FIG. 1 for the sake of simplicity of explanation, there may be one database structure, or four or more database structures.

In the present embodiment, as the computer executes the computer program, a main controller section 10, a search processing section 11, a set management section 12, an image processing section 13, and an interface processing section 14 are formed as functional blocks in the computer, and the external storage device is used as a set storage device 20.

[Functional Configuration of System]

The main controller section 10, which acts as a core of the data management system 1, comprehensively controls initiation, shutdown, and collaboration of operations for other functional blocks 11-14. It also analyzes the contents of search criteria entered to issue a search instruction, and outputs the search result to the search requesting end.

The main controller section 10 has a temporary storage area 10R comprised of a RAM or the like, so that information that is temporarily generated is retained in the temporary storage area 10R until it is eventually deleted or saved.

The search processing section 11 directs a data search toward the database structures A, B, and C in accordance with search criteria instructed from the main controller section 10, and collectively obtains search results in the form of listed files. Non-listed search results may be listed by the search processing section 11.

The list may contain codes (customer codes, etc., if customer data is applicable) for identifying elements of sets.

The set management section 12 collects as sets the lists obtained from the search processing section 11, and hierarchically manages the respective sets according to the set theory concept.

For collecting as sets, sets having identical or similar implications are grouped and organized in folders. The folder is called a set folder. Whether implications are similar or not may be implemented by, for example, pre-assigning a common code to identical or similar implications and checking whether a set inputted matches that common code. Sets may also be classified as the operator inserts sets, as judged appropriately, into the hierarchical set folder that is pre-configured according to the purpose.

Here, "hierarchical management based on the set theory concept" means that the set folder in the upper level of the hierarchy is represented as a result of a logical operation, e.g., a result of a logical sum, for set folders or sets in the lower level of the hierarchy thereof, and that set folders may be handled as equivalents to sets. For example, Set Folder "1-4 Employees" is a logical sum of Sets "1 Employee", "2 Employees", "3 Employees", and "4 Employees" in the lower level of the hierarchy thereof. Set Folder "1-9 Employees" may be represented by a logical sum of Set Folder "1-4 Employees" and Set Folder "5-9 Employees" in the lower level of the hierarchy thereof. If the lower level of the hierarchy is a set folder, an operation to determine a logical sum of its further lower level of the hierarchy is repeated. The lowest level of the hierarchy is not a set folder, but a set.

With such a hierarchical organization, sets to be really stored in the set storage device 20 are simple ones in the lowest level of the hierarchy, such as "1 Employee" and "2 Employees"; sets, such as "1-4 Employees", may be defined as set folders in the upper level of the hierarchy. By providing such functionality to the set management section 12, the problem of having duplicate sets having similar implications as in the prior art can be avoided.

The image processing section 13 performs image processing to cause the display device connected to the computer to display the hierarchical structure of sets as a hierarchical image, and display in detail the contents of the individual set folders, sets, and data.

The interface processing section 14 performs bidirectional communication control between the database structures A, B, and C; control for receiving various instructions entered by the operator through the input device IN connected to the computer, or instructions from the local system CS and computer program; control for causing the display device DP to display the results of image processing performed by the image processing section 13; control for outputting the search results to the search requesting end; and so forth.

It should be appreciated that the search results obtained from the database structures A, B, and C are comprised of a list of individual data that meets search criteria, although data IDs may be managed with different code systems between the database structures A, B, C and the data management system 1. In consideration of that point, the data management system 1 includes a mechanism for unitary management by using a common code system for data IDs.

More specifically, the contents of the data items managed by the system, such as, for example, customers, employees, etc., are regarded as objects, and individual objects are identified by a common ID, or object ID. Then, the set storage device 20 stores an object ID table 21 (hereinafter described in detail) that defines a correspondence between an object code for identifying an object managed under the code system for each database structure and the afore-described object ID.

When search results are inputted, object IDs are assigned to all of them, thereby allowing for unitary management within the system. Hence, the data managed under different code systems between the database structures can be handled as a collection of commonly formatted data, thereby facilitating logical operations on them.

Using the list obtained from the database structures A, B, and C as a set, the data management system 1 includes a set definition mechanism for defining an implication for a set and storing that set, and a list import mechanism for importing the list of data that provides a basis for creating a new set, so that the set definition mechanism and list import mechanism are activated independently and concurrently. The set definition mechanism coordinates the respective database structures A, B, and C with the search processing section 11, so that when the set creation is completed, they may be disconnected from each other.

In order to obtain a list from the result of combining sets (which is also a set) while it is disconnected for the database structures A, B, and C, the list import mechanism, in the present embodiment, is provided with a minimum table where individual object IDs that identify set elements are mapped to objects (e.g., customer names, addresses, telephone numbers, etc.). Using this table, the operator may easily understand which object ID an object corresponds to. Furthermore, because there is no need to separately access the database structures A, B, and C that have objects, such as customer names, they may be disconnected. Of course, if the database structures A, B, and C are connected to the present system, more detailed objects can be searched.

According to such an approach, the data management system 1 need not be configured for direct connection with the database structures A, B, and C.

[Set Storage Device]

The set storage device 20 is now described. In the set storage device 20 are formed an object ID table 21, a set storage area 22, and a hierarchical definition area 23.

The object ID table 21, which is a conversion table for unitary management of all search results as objects handled under the present system, as described above, provides a mapping or correspondence table between object IDs and object codes used to identify data or sets that provide a basis for creating sets. An example of object IDs is presented in FIG. 2.

Figure 2:
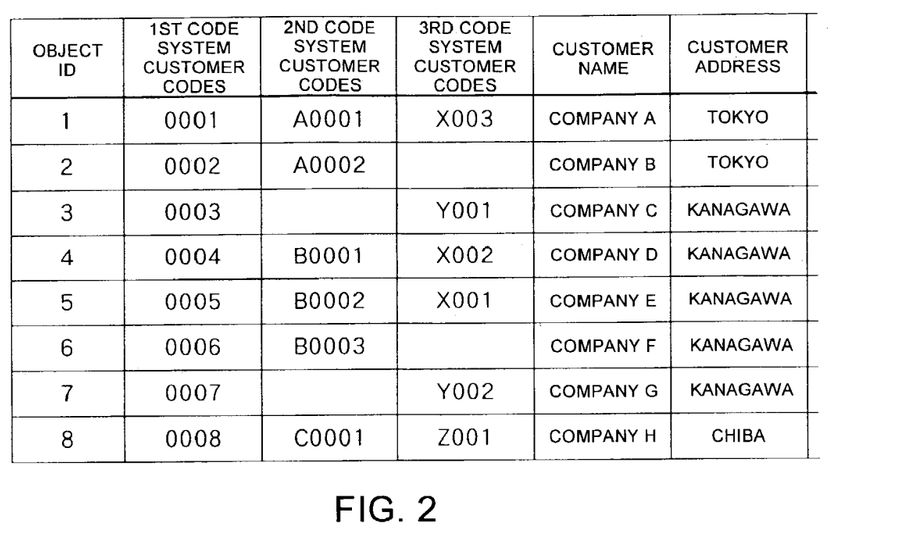
FIG. 2 is a diagram illustrating an example of contents of an object ID table.

In FIG. 2, customer code "0002" obtained by searching the database structure A having the first code system corresponds to object ID "2"; and customer code "A0002" obtained by searching the database structure B having the second code system similarly corresponds to object ID "2". This example suggests that customer code "0002" of the database structure A and customer code "A0002" of the database structure B denote the same customer.

For object code ID "3", it is suggested that there is a customer code corresponding to the database structures A and C, but for the database structure B having the second code system, there is no corresponding customer code.

In the object ID table 21, several management items for the object corresponding to its object ID, such as customer name, address, telephone number, etc., are set as mapped. These management items are established with the aim of making it easy to identify a request of interest when the operator makes a search request.

The set storage area 22 summarizes search results as objects, which are stored as sets. In the set storage area 22 are saved set definitions that represent contents of the sets. An example of the set storage area 22 is illustrated in FIG. 3.

Figure 3:
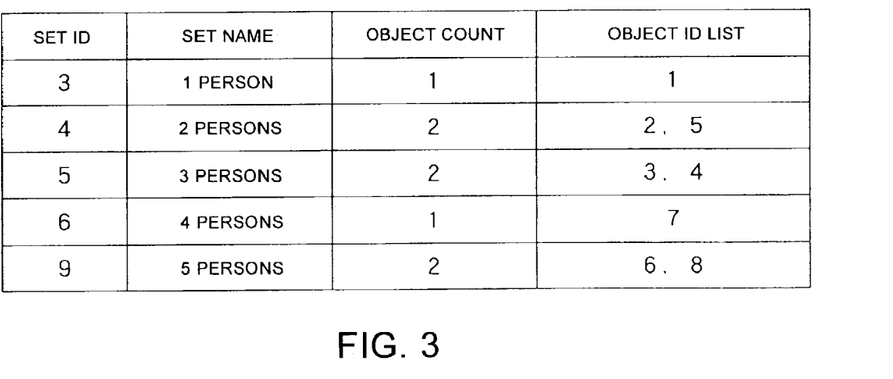
FIG. 3 is a diagram illustrating an example of contents of a set storage area.

In FIG. 3, "Set ID" is an ID for univocally identifying a relevant set in the set storage area 22 (its content is identified by "Set Name"). "Object ID List" is a collection of objects IDs for objects contained in the relevant set, and "Object Count" denotes the number of object IDs contained in the "Object ID List".

The hierarchical definition area 23 is an area for retaining definition information that defines the hierarchical structure of multiple sets. Although there is no specific limitation on the format for representing the hierarchical structure of sets, it is convenient to represent it in the XML (Extensible Markup Language) format, at present. A definition example of the XML-formatted hierarchical structure is illustrated in FIGS. 5 and 6.

Figure 5:
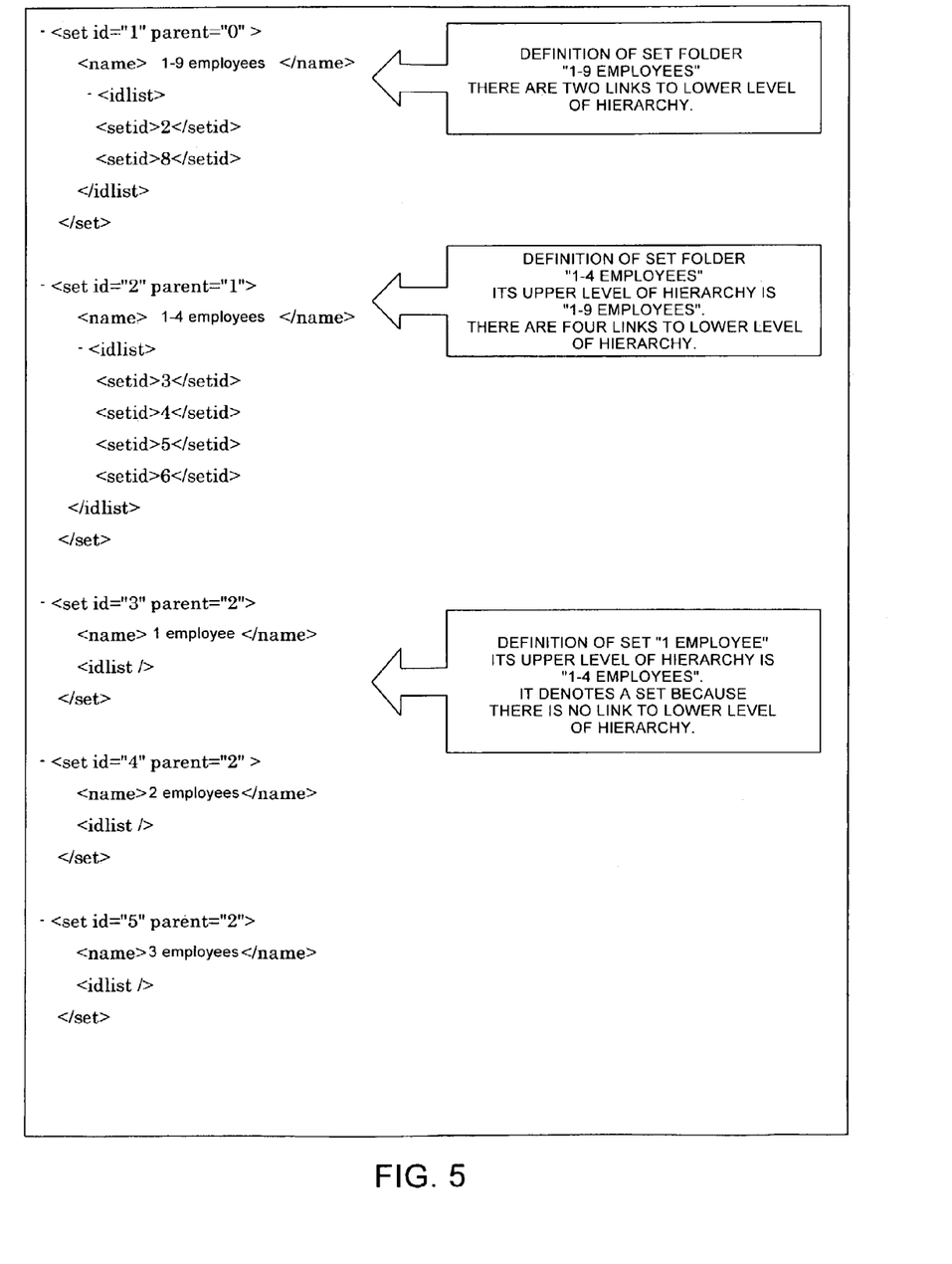
FIG. 5 is an explanatory diagram defining a portion of a hierarchical structure of sets in a set folder.
Figure 6:
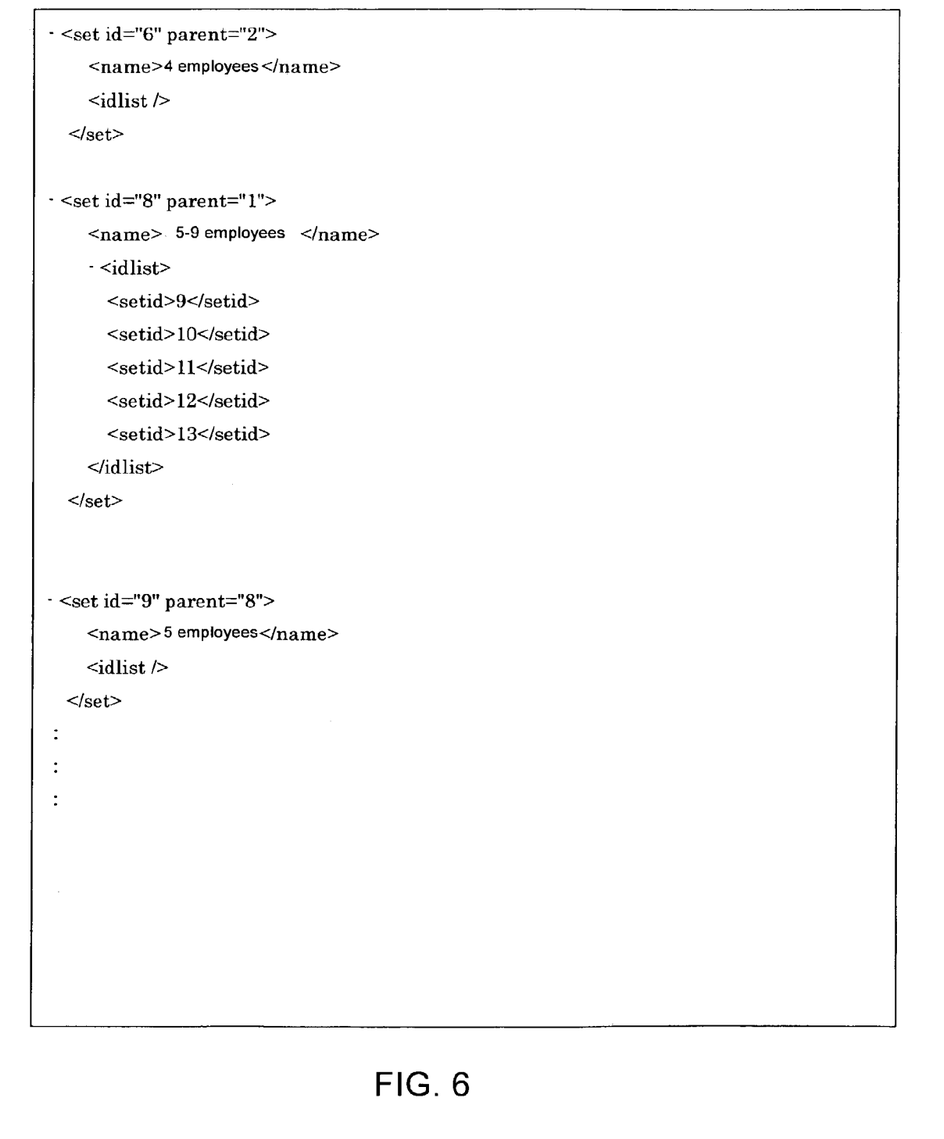
FIG. 6 is an explanatory diagram defining a portion of a hierarchical structure of sets in a set folder (continued from FIG. 5).

FIGS. 5 and 6 define a portion of the hierarchical structure of sets within a plurality of set folders. The definition information at the uppermost level of the hierarchy is for Set Folder "1-9 Employees, with two links to a lower level of the hierarchy thereof. The two links are associated with Set Folder "1-4 Employees" and Set Folder "5-9 Employees".

Set Folder "1-4 Employees" includes four links to a further lower level of the hierarchy. The four links to the hierarchy are Set "1 Employee", Set "2 Employees", Set "3 Employees", and Set "4 Employees". They do not have any link to still lower levels of the hierarchy, which suggests that they are not set folders but sets.

Similarly, Set Folder "5-9 Employees" includes five links, at a lower level of the hierarchy thereof, Set "5 Employees", Set "6 Employees", Set "7 Employees", Set "8 Employees", and Set "9 Employees".

Next, the operating procedures of the data management system 1 so configured are described.

[Definition/Update of Set Hierarchy]

For example, the operating procedures where a request is made via the interface processing section 14 from the operator for definition/update of the set hierarchy are described.

The main controller section 10 reads the information stored in the hierarchical definition area 23 of the set storage device 20 into the temporary storage area. It then builds a hierarchical image according to the set information read and causes the display device DP to display it via the interface processing section 14. Thus, the hierarchical image as shown in FIGS. 7-9 is displayed on the display device DP.

Figure 7:
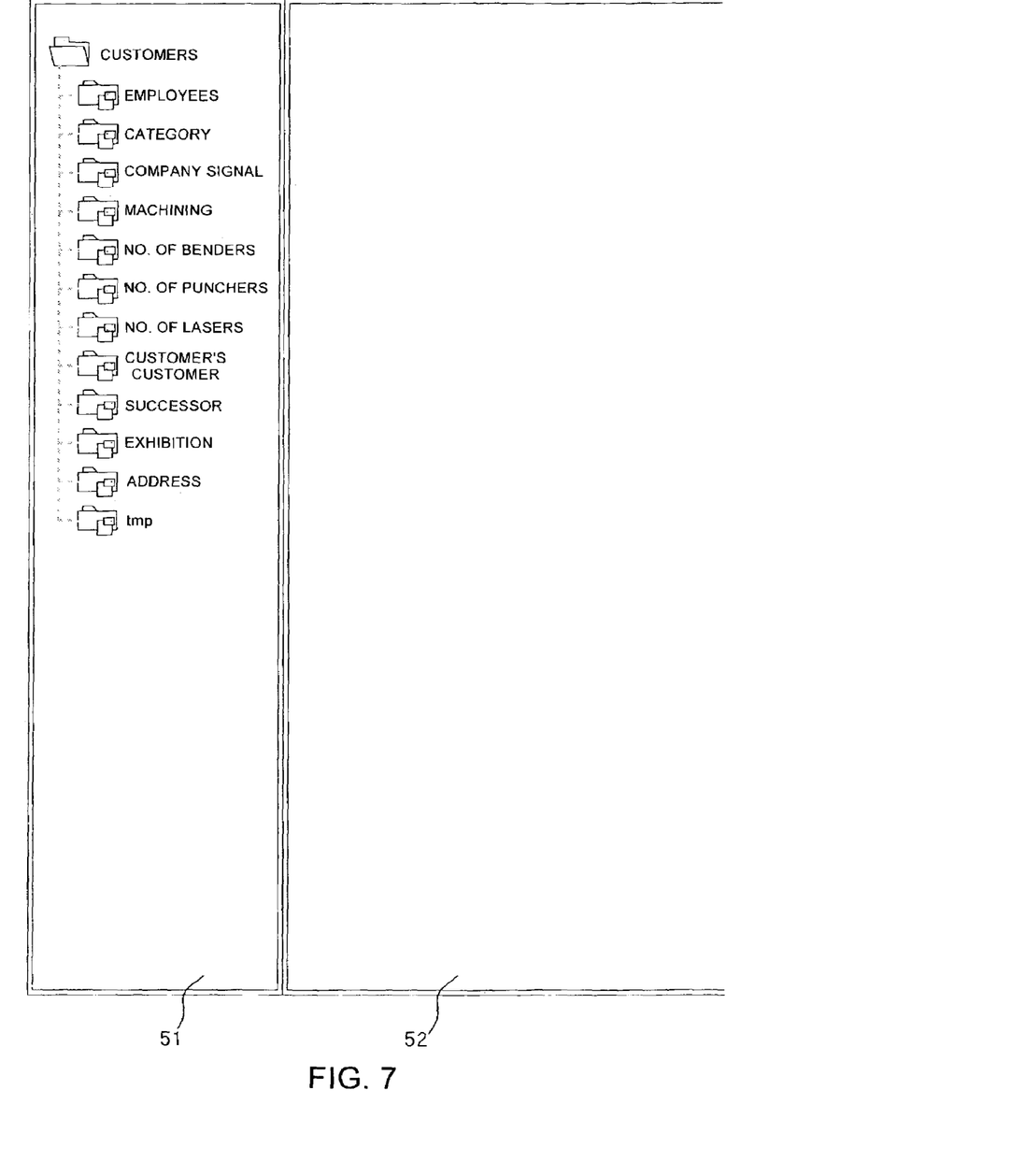
FIG. 7 is an explanatory diagram of a hierarchical image.
Figure 8:
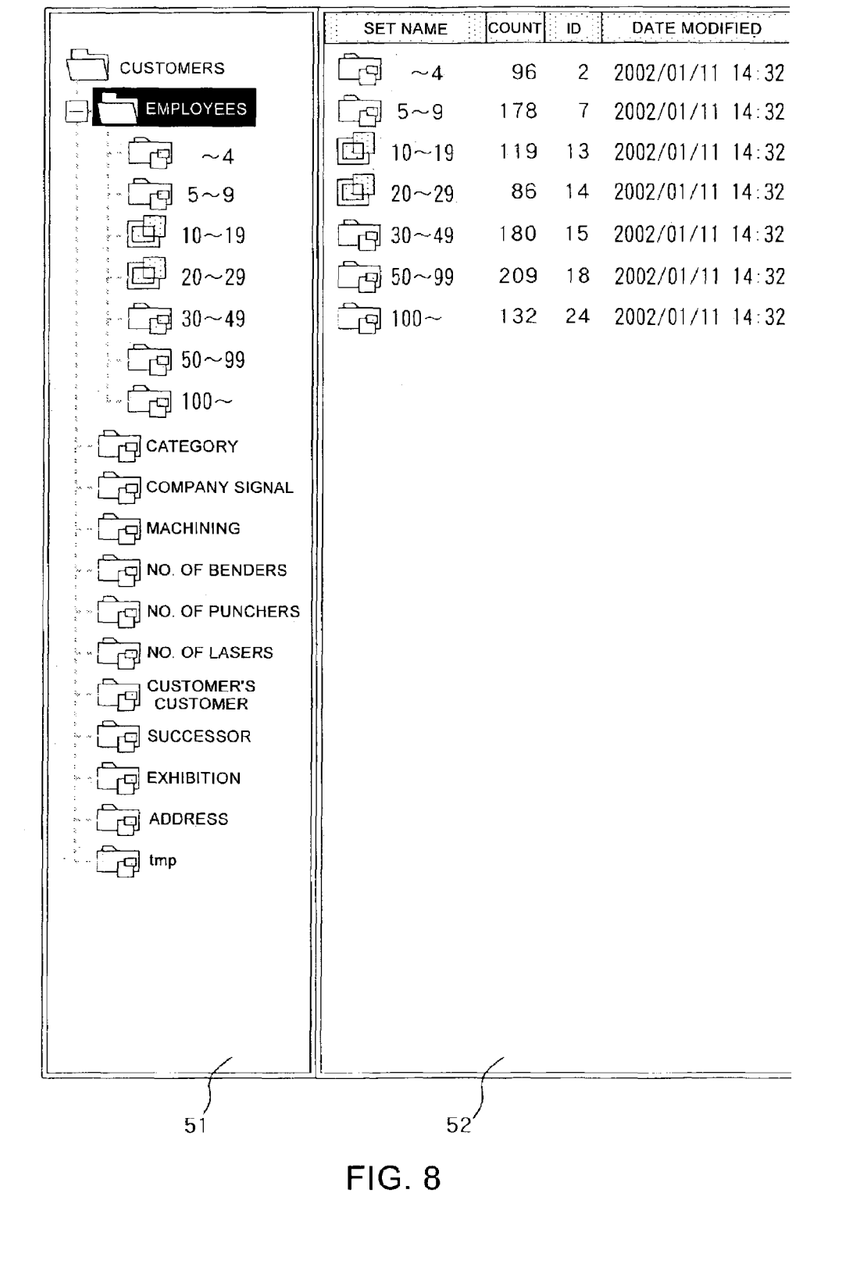
FIG. 8 is an explanatory diagram of a hierarchical image.
Figure 9:
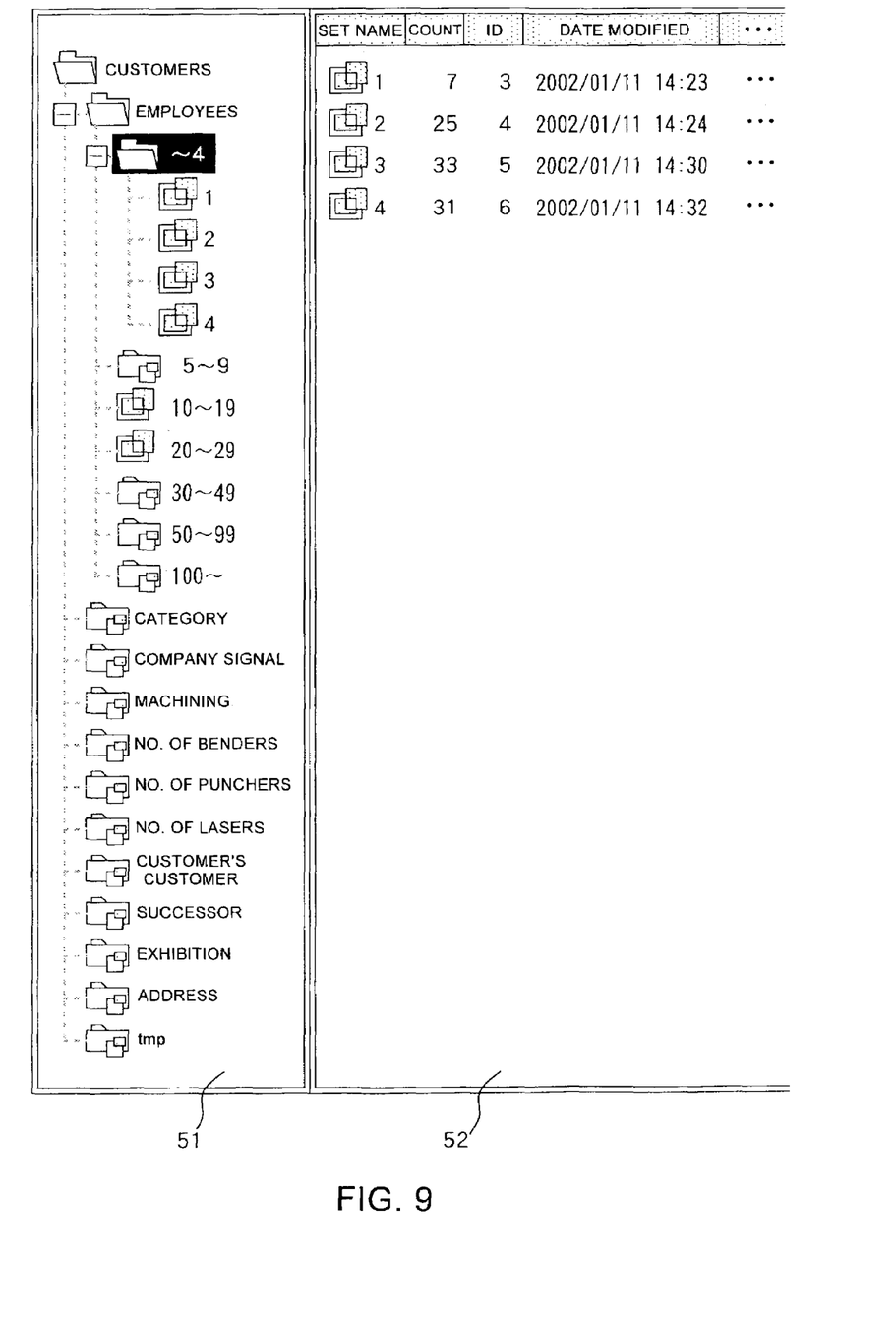
FIG. 9 is an explanatory diagram of a hierarchical image.

It should be appreciated that FIGS. 7-9 present an example of the tree-structured hierarchical image such that the hierarchical structure is easy to understand, although any format of hierarchical image may be acceptable as far as the hierarchical structure is represented.

As the operator instructs edit operations, such as add a new level of the hierarchy, delete an unnecessary level of the hierarchy, move, and copy, for the hierarchical image displayed in this manner, the main controller section 10 has a logic for modifying the definition information stored in the temporary storage area. The logic itself is an approach that is conventionally implemented by many systems, and thus is not described herein. The editing performed in this process is to build a logical hierarchical concept of sets, and sets need not be pre-existent at the time of the concept definition.

In response to the instruction from the operator, the set hierarchical definition may be stored in the hierarchical definition area 23 in the middle of editing or upon completion of editing. When the set hierarchical definition is stored in the hierarchical definition area 23, the main controller section 10 deletes the definition information stored in the temporary storage area.

Although there is no particular problem in the middle of editing of the set hierarchical definition, sets, instead of set folders, need to be defined in the lowest level of the hierarchy at the time of completion of editing. It is also necessary that a means for data cooperation with the database structure be established, such as what kind of search criteria should be used for a query from which database structure to obtain a desired result, or whether it already exists as a search result in the form of a file, etc.

[Creation/Update of Set]

The operation is now described where a request for creating/updating the sets is made in response from the operator, or automatically (for example, via timer function that specifies the date and time).

The main controller section 10 reads the definition information stored in the hierarchical definition area 23 of the set storage device 20 into the temporary storage area. It also checks whether each of the sets has already been stored in the set storage area 22 according to the definition information read. Even though they are stored, it detects such sets that need to be updated as the data in the database structures A, B, and C have been updated since they were stored, and such sets that have not been stored yet since the set hierarchical definition, and requests the search processing section 11 to search data that provides a basis for creating such sets and to import the search result.

The search processing section 11 asks the database structures A, B, and C to search data requested, and imports the search result, which is passed to the main controller section 10.

The main controller section 10 stores the search result into the temporary storage area and matches the data for the item that identifies an object in the search result with the contents of the object ID table 21 shown in FIG. 2 to create a list where it is converted to an object ID.

Figure 4A:
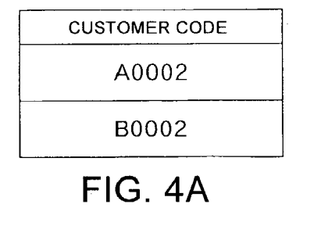
FIG. 4A is a diagram illustrating an example of data search results for "companies with two employees" in a database structure B.
Figure 4B:
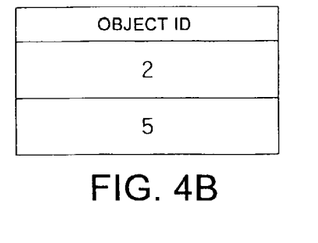
FIG. 4B is a diagram illustrating the state where the search results of FIG. 4A are converted to an object ID list.

FIG. 4A shows the data search results for "companies with two employees" in the database structure B, where customer codes "A0002" and "B0002", which are the search results, are created as a list having object IDs "2" and "5", as shown in FIG. 4B. The list of the object IDs so created is stored, as a set, in the set storage area 22.

[Set Access: Display/Selection of Set Hierarchy]

The operating procedures are described where a query request for a set is made by the operator via the interface processing section 14.

The main controller section 10 reads the definition information stored in the hierarchical definition area of the set storage device 20 into the temporary storage area 10R. It then builds a hierarchical image according to the definition information read and outputs it to the display device DP.

During this process, if the number of sets increases, it is not desirable to expand all levels of the hierarchy, from the lowermost to the uppermost, and display them at the same time, because the viewing size increases accordingly. Thus, the main controller section 10 controls the image processing section 13 to initially display only the uppermost level or its immediately lower level of the hierarchy from the hierarchical image in the hierarchically organized display area 51 shown in FIG. 7. During that time, the detail display area 52 is blank.

In the hierarchically organized display area 51, upon detecting that the operator specifies, via a pointer or the like, a set folder of interest, the main controller section 10 controls the image processing section 13 so that set folders and sets in the hierarchy specified are displayed. This causes the display contents shown in FIG. 7 to change to those as shown in FIG. 8. In the detail display area 52, set names, count of data belonging to the set, object IDs, date modified, and so forth are displayed for each set folder or set. If a set folder in a still lower level than the expanded level of the hierarchy as shown in FIG. 8 is specified, the display contents transition to those as shown in FIG. 9.

A similar screen transition occurs when a set folder in another level of the hierarchy is specified.

When the set of interest is displayed on screen, the operator may specify that set via a pointer or the like to view its contents or use it for mathematical operation in conjunction with other sets.

When the contents of a set are viewed, not only the object ID of the set is merely displayed, but also items for facilitating identification of objects, such as customer names and addresses, that are stored in the object ID table 21 can be fetched and displayed.

[Set Access: Logical Sum Operation on Sets in Lower Level of Hierarchy of Set Folder]

On the display screen of the set hierarchy in FIGS. 7-9, the operator may view the contents of a set folder and use it for mathematical operation with other sets, in a similar manner as specifying a set, as described above.

Upon detecting that such operation is performed by the operator, the main controller section 10 cooperates with the set management section 12 to check the architecture of the lower level of the hierarchy in the specified set folder by investigating the set storage area 22 of the set storage device 20. If the lower level of the hierarchy is still a set folder, a similar approach is used to check still lower level(s) of the hierarchy. It fetches all sets in all the subordinate levels of the hierarchy below the set folder specified and performs a logical sum operation between those sets. It then causes the result of the logical sum operation to be displayed on screen as the contents of the sets in the set folder specified. In this way, the contents of the set folder could be viewed or used for mathematical operation with other sets, as if such sets initially existed.

In the example shown in FIG. 7, when set folder "-4" in "Employees" is designated, a logical sum operation is performed on its lower-level sets "1 employee", "2 employees", "3 employees", and "4 employees" and returned as a set.

If the same set folder is viewed frequently, caching techniques may be used: for example, the result of the logical sum operation performed as described above is saved and, when the same set folder is specified again, the process for logical sum operation on the sets is omitted and the content saved is fetched out.

In this way, because set folders as viewed by the operator can be handled as equivalents to sets, similar sets having duplicate contents may be automatically replaced in the set hierarchy.

[Hierarchical Management of Sets]

As means to organize sets that were already created, set folders may be created, and during the process of classifying those having similar implications in the same folder, duplicate sets or the like may be discovered, thereby avoiding redundancy.

During the process of finding a set of interest, one can easily discover that set by tracing the levels of the hierarchy.

By designing the set category in a hierarchical manner, categories to be combined with sets become more obvious, so that a set for a simpler condition need only be provided from sets that combine a plurality of conditions; as a result, the number of sets required to be saved is reduced. Assume, by way of example, that the customers are classified by sales amount into ten levels, classified by geographical region into ten locations, and classified by age into ten levels. Then, all combinations thereof are equal to 10×10×10; however, if sets are created for each of the classifications of sales amount, geographical region, and age, respectively, and processing is instead performed to determine a logical product of those sets, as needed, then 10+10+10 sets need only to be provided.

(Logical Sum of Lower-Level Sets)

Defining, as a set folder, a set obtained by a logical sum of lower-level sets eliminates the need for physically creating it, so that sets having similar implications need no longer be provided in redundancy, wherever possible.

Furthermore, by hierarchically configuring sets under this concept, sets can be organized more efficiently.

(Importing of Sets from Multiple Databases)

Even if there are multiple database structures that cover objects that are identical but have different codes (customer codes, etc.) for identifying objects, operations among those database structures can be achieved through sets, without consolidating those database structures. For example, in cases where one database manages customers' sales details, while the other manages repair-related data, the data management system 1 according to the present embodiment enables the relationship to be investigated between purchasers of a certain product and persons requesting repair of old models. Conventionally, this would require system consolidation, or require data that combines the data from both of the systems to be configured, which would involve considerable expenses and/or operating costs. With the data management system 1 of the present embodiment, it is only necessary to search persons who purchased the product of interest and persons who repaired it, and organize them as sets.

(Implementation of Search System with Only Sets Disconnected from Database)

Because the step of preparing sets and the step of providing search service that combines sets can be performed at different timings, system administration can be quite simplified.

The data used for processing related to analysis of customers, etc. may be usually inappropriate at the time when the daily business activity is conducted. In such cases, information is typically finalized at the time when daily processing is closed at night. At this point in time, processing for set collection may be performed and set-based search service may be operated next day.

It should be appreciated that in the present embodiment, the invention has been described with reference to the scheme where the object ID table 21 exists; however, if there is only one type of applicable database structure and if a one-to-one equivalent relationship exists between that database structure and the object ID of the present invention, the present invention may be implemented even if the object ID table 21 does not exist.

Accordingly, as is clear from the description above, the present invention can provide a data management system that allows search and other operations on sets to be performed quickly by managing sets in an orderly fashion.

What is claimed is:

1. A data management system comprising:
a storage device storing a hierarchy of sets according to attributes within the sets, the hierarchy of sets including multiple levels;
a processor that, upon specification of a particular set in a first level of the multiple levels, performs a logical operation on all sets of the hierarchy of sets that belong to a lower level than the first level to produce a result of the logical operation as contents of the particular set specified and wherein the processor causes a predetermined display device to display the result upon production thereof;
wherein specification of the particular set includes specifying attributes within the particular set and wherein the attributes within the particular set are selected from the attributes according to which the hierarchy is stored.

2. The data management system according to claim 1 wherein:
the set is stored in a set folder; and
the processor updates the contents of the particular set and any other sets in the first level as new data or a new set is placed in the set folder.

3. The data management system according to claim 1, wherein:
the processor includes an ID conversion mechanism that converts first IDs of data represented by multiple types of code systems that are different from each other into second IDs of a common code system; and wherein the first IDs of data that have identical or similar attributes to each other are converted into the second IDs by said ID conversion mechanism, so that the first IDs of data that have identical or similar attributes are converted into and handled as a common set on which the logical operation can be performed, respectively.

4. The data management system according to claim 2, wherein:
the processor includes an ID conversion mechanism that converts first IDs of data represented by multiple types of code systems that are different from each other into second IDs of a common code system; and wherein
the first IDs of data that have identical or similar attributes to each other are converted into the second IDs by said ID conversion mechanism, so that the first IDs of data that have identical or similar attributes are converted into and handled as a common set on which the logical operation can be performed, respectively.

5. The data management system according to claim 1, wherein:
the processor includes a set definition mechanism for defining an attribute for a chosen set and a list import mechanism for importing a list of data that provides a basis for creating a new set, wherein the set definition mechanism and the list import mechanism are activated independently and concurrently.

6. The data management system according to claim 1, further comprising:
a means for causing the storage device to retain information that represents an attribute for data identified by an individual common ID in such a form as paired with the common ID;
wherein the processor reads and utilizes the information that represents an attribute from said storage device, in order to identify the result of the logical operation.

7. The data management system according to claim 2, further comprising:
a means for causing the storage device to retain information that represents an attribute for data identified by an individual common ID in such a form as paired with the common ID;
wherein the processor reads and utilizes the information that represents an attribute from said storage device, in order to identify the result of the logical operation.

8. The data management system according to claim 3, further comprising:
a means for causing the storage device to retain information that represents an attribute for data identified by an individual common ID in such a form as paired with the common ID;
wherein the processor reads and utilizes the information that represents an attribute from said storage device, in order to identify the result of the logical operation.

9. The data management system according to claim 4, further comprising:
a means for causing the storage device to retain information that represents an attribute for data identified by an individual common ID in such a form as paired with the common ID;
wherein the processor reads and utilizes the information that represents an attribute from said storage device, in order to identify the result of the logical operation.

10. The data management system according to claim 5, further comprising:
a means for causing the storage device to retain information that represents an attribute for data identified by an individual common ID in such a form as paired with the common ID;
wherein the processor reads and utilizes the information that represents an attribute from said storage device, in order to identify the result of the logical operation.

11. A computer program for causing a computer system having a storage device and a display device to execute processing steps, the computer program comprising:
commands for organizing sets, or a collection of data that belong to a certain conditional scope, according to attributes thereof into a hierarchy of sets with multiple levels, and storing the hierarchy of sets in the storage device; and
commands for performing, upon specification of a particular set in a first level of the hierarchy of sets, a logical operation on all sets that belong to a lower level than the first level of the hierarchy of sets to produce a result of the logical operation as contents of the particular set specified thereof and causing the display device to display the result of the logical operation as contents of the particular set specified;
wherein specification of the particular set includes specifying attributes within the particular set and wherein the attributes within the particular set are selected from the attributes according to which the hierarchy is stored.

12. The data management system according to claim 1 wherein the logical operation is a logical sum, the logical sum being the summation of sets that are identified by an attribute from the attributes within the particular set.

13. The data management system according to claim 1 wherein the multiple levels includes multiple lower levels of sets and each of the multiple lower levels of sets is a logical sum of a level of sets immediately above it and wherein the logical sum is the summation of the sets of the lower levels that are immediately below whatever level of sets is immediately above it.

14. The computer program according to claim 11 wherein the logical operation is a logical sum, the logical sum being the summation of sets that are identified by an attribute from the attributes within the particular set.

15. The computer program according to claim 11 wherein the multiple levels includes multiple lower levels of sets and each of the multiple lower levels of sets is a logical sum of a level of sets immediately above it and wherein the logical sum is the summation of the sets of the lower levels that are immediately below whatever level of sets is immediately above it.

16. The data management system of claim 1 wherein the attributes within the sets are indicative of the data in those sets, the first level is a first level of sets and wherein the hierarchy of sets includes:
i) the first level of sets;
ii) a first lower level of sets wherein the first level of sets is a logical sum of the sets of the first lower level according to attributes within the sets of the first lower level wherein the logical sum of the sets of the first lower level is a summation of the sets of the first lower level; and
iii) a second lower level of sets wherein the first lower level of sets is a logical sum of the sets of the second lower level according to attributes within the sets of the second lower level wherein the logical sum of the sets of the second lower level is a summation of the sets of the second lower level; and
wherein the processor performs the logical operation on the sets of the first lower level of sets and the second lower level of sets to produce the result of the logical operation as contents of the particular set specified.

17. The data management system according to claim 16 wherein:
the particular set is stored in a set folder; and the processor updates the contents of the particular set and any other sets in the first level as new data or a new set is placed in the set folder.

18. The data management system according to claim 17, wherein:
the processor includes an ID conversion mechanism that converts first IDs of data represented by multiple types of code systems that are different from each other into second IDs of a common code system; and wherein
the first IDs of data that have identical or similar attributes to each other are converted into the second IDs by said ID conversion mechanism, so that the first IDs of data that have identical or similar attributes are converted into and handled as a common set on which the logical operation can be performed, respectively.

19. The data management system according to claim 18, wherein:
the processor includes a set definition mechanism for defining an attribute for a chosen set and a list import mechanism for importing a list of data that provides a basis for creating a new set, wherein the set definition mechanism and the list import mechanism are activated independently and concurrently.

20. The data management system according to claim 19, further comprising:
a means for causing the storage device to retain information that represents an attribute for data identified by an individual common ID in such a form as paired with the common ID;
wherein the processor reads and utilizes the information that represents an attribute from said storage device, in order to identify the result of the logical operation.

* * * * *